Sept. 25, 1923.
H. E. SHERMAN ET AL
1,468,979
DECOY
Filed Jan. 7, 1922
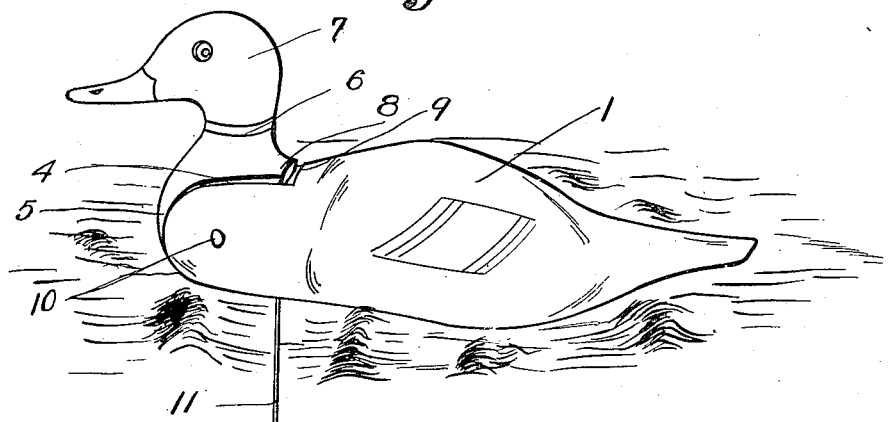
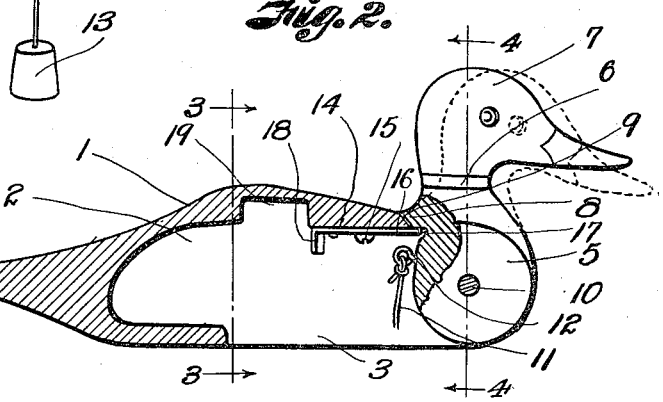
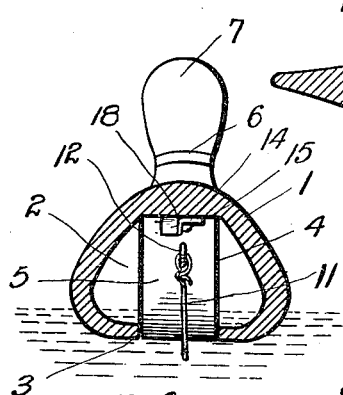
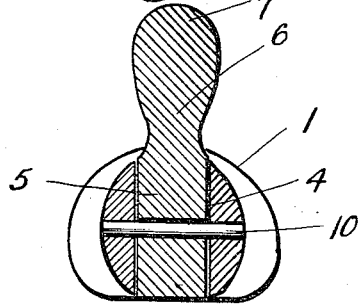
INVENTORS
Harry E. Sherman
Louie A. Sherman
BY
ATTORNEY Patented Sept. 25, 1923.

1,468,979

UNITED STATES PATENT OFFICE.

HARRY E. SHERMAN AND LOUIE A. SHERMAN, OF KANSAS CITY, MISSOURI, ASSIGNORS, BY MESNE ASSIGNMENTS, TO AMERICAN CARTRIDGE COMPANY, OF KANSAS CITY, MISSOURI, A CORPORATION OF MISSOURI.

DECOY.

Application filed January 7, 1922. Serial No. 527,768.

*To all whom it may concern:*

Be it known that we, HARRY E. SHERMAN and LOUIE A. SHERMAN, citizens of the United States, residing at Kansas City, in the county of Jackson, and State of Missouri, have invented certain new and useful Improvements in Decoys; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to decoys and more particularly to one simulating wild fowl, the principal object of the invention being to provide a decoy which will simulate the fowl in action as well as appearance, and which may be collapsed for storage or shipment.

In accomplishing these objects, we have provided certain novel details of construction, the preferred form of which is illustrated in the accompanying drawings, wherein—

Fig. 1 is a perspective view of a decoy made in simulation of a wild duck and illustrated as riding upon a body of water.

Fig. 2 is a side elevation of the same, the body part being in section to illustrate the detail construction.

Fig. 3 is a vertical section on the line 3—3 of Fig. 2.

Fig. 4 is a vertical section on the line 4—4 of Fig. 2, and

Fig. 5 is an elevation similar to Fig. 2, but showing the decoy collapsed.

Referring more in detail to the drawings, 1 designates a body member corresponding in shape to that of a wild duck and which may be decorated on the exterior to resemble the coloring and physical characteristics of the bird, the interior of the body being hollowed out to form a chamber 2 having a central bottom opening 3, extending forwardly from about the longitudinal center of the body.

As a decoy is intended to have the appearance of the fowl as the latter is riding upon the water, the body portion is shaped to correspond to that of the fowl under such conditions by forming the lower part of the body of considerably greater width than the upper ridge, (Fig. 3). The interior of the body is hollowed so that the sides of the chamber 2 extend laterally from the central bottom opening 3, forming ledges on opposite sides of the opening, over which the water rises when the decoy is seated on the surface of a lake or stream, this arrangement and construction providing a stabilizing support which, while permitting the rocking movement natural to the live bird, will not cause the body to sink lower in the water than is sufficient to afford an anchorage and permit the body to roll, the water ballast returning the body to upright position at each rolling movement.

The body opening is extended vertically at the front to form a slot 4 and pivoted in said slot is a disk 5, forming a part of the breast of the decoy and carrying the neck 6 and head 7. At the back of the neck 6 is a boss 8 adapted to engage a shoulder 9 on the body member to limit rearward pivotal movement of the neck and hold the head upright. The pivotal mounting is on a pin 10 that extends through the forward portions of the body and through the disk 5, the mounting being sufficiently loose to permit free movement of the head so that it may raise and lower under the rocking motion imparted by the usual surface disturbances of the water, and thereby afford an additional simulation of a live bird.

Attached to the disk 5 above the center axial line is an anchor rope 11, which may be attached to the disk by an eye-bolt 12, and which carries an anchor weight 13, whereby the decoy is held in upright position and prevented from drifting. The anchor not only serves to retain the decoy within a reasonable range of its original position, but also serves to normally retain the head erect and return it to such position after each downward movement that is induced by the rocking of the body through the action of the water.

In order to limit the downward rocking movement of the head, we provide a latch 14 comprising a strip of sheet metal pivoted on a pin 15 within the body, and having an end 16 adapted to project into a slot 17 in the neck 6 and which is of sufficient width to permit the play of the head. The opposite end of the latch is turned to form a handle member 18, whereby the latch may be easily manipulated. The slot 3 in the bottom of the body member extends rearwardly a distance sufficient to receive the head of the decoy when the latch is removed and the head turned about on its pivot, (Fig. 5), the chamber 2 being extended at the top to form a pocket 19, into which the bill of the decoy may project so that the head and neck may be housed within the body member when the decoy is collapsed for storage or shipment, thereby not only avoiding breakage, but forming a more compact object, whereby a greater number of decoys may be packed in a given space than would be possible were the head formed rigidly with the body. With such construction a number of decoys may be packed for shipment with a minimum liability of breakage and when desired for use, may be set up by turning the head about on its pivot and placing the latch to limit movement of the head to that desirable for simulating a live bird.

When the decoy is placed on the surface of the water, its weight will submerge the lower portion of the body so that the chamber 2 is filled to a limited depth, thereby stabilizing the body without interfering with the desired rocking movement. As the surface of the water upon which the decoy is placed is usually disturbed to some extent, the waves will rock the body so that it will tip at its ends. This tipping movement imparts alternate pulling and releasing effects on the pivoted disk forming a connection between the head and body, so that the head will rock within the range permitted by the latch 14, thereby simulating the natural movement of a live fowl on the water, the decoy having limited lateral rocking movement which is stabilized by the water ballast within the interior chamber.

What we claim and desire to secure by Letters-Patent is:

1. A decoy comprising a body member having an interior chamber opening through the bottom of the body and having a vertical breast slot communicating with said chamber, a disk pivoted in said slot on a horizontal axis, and having an extension forming the neck and head of the decoy, and an anchor connected with said disk to yieldingly retain the head erect.

2. A decoy comprising a body member having an interior chamber opening through the bottom of the body and having a vertical breast slot communicating with said chamber, a disk pivoted in said slot on a horizontal axis, and having an extension forming the neck and head of the decoy, and an anchor connected with said disk to yieldingly retain the head erect, said extension having a boss engageable with the body member to limit movement of the extension.

3. A decoy comprising a body member having an interior chamber opening through the bottom of the body and having a vertical breast slot communicating with said chamber, a disk pivoted in said slot on a horizontal axis, and having an extension forming the neck and head of the decoy, and an anchor connected with said disk to yieldingly retain the head erect, said extension having a boss engageable with the body member to limit movement of the extension in one direction, and a latch on the body member engageable with said extension to limit movement thereof in the opposite direction.

4. A decoy comprising a body member having an interior chamber opening through the bottom of the body and having a vertical breast slot communicating with said chamber, a disk pivoted in said slot on a horizontal axis, and having an extension forming the neck and head of the decoy, and an anchor connected with said disk to yieldingly retain the head erect, said extension having a boss engageable with the body member to limit movement of the extension in one direction, and a latch on the body member engageable with said extension to limit movement thereof in the opposite direction, the disk being movable on its axis to house the neck and head members in the body chamber.

In testimony whereof we affix our signatures.

HARRY E. SHERMAN.
LOUIE A. SHERMAN.